(12) United States Patent
Lee et al.

(10) Patent No.: US 8,664,322 B2
(45) Date of Patent: Mar. 4, 2014

(54) THERMOPLASTIC RESIN COMPOSITION AND PLASTIC ARTICLE

(75) Inventors: Bong Jae Lee, Seoul (KR); Jung Hoon Park, Incheon (KR); Tae Uk Kim, Suwon-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/413,630

(22) Filed: Mar. 30, 2009

(65) Prior Publication Data

US 2009/0209696 A1 Aug. 20, 2009

Related U.S. Application Data

(63) Continuation-in-part of application No. PCT/KR2007/004743, filed on Sep. 28, 2007.

(30) Foreign Application Priority Data

Sep. 29, 2006 (KR) ........................ 10-2006-0095291

(51) Int. Cl.
*C08K 3/40* (2006.01)

(52) U.S. Cl.
USPC .......................................... 524/494; 524/496

(58) Field of Classification Search
USPC ........................................................ 524/494
See application file for complete search history.

(56) References Cited

U.S. PATENT DOCUMENTS

| | | |
|---|---|---|
| 4,006,272 A | 2/1977 | Sakaguchi et al. |
| 4,027,073 A | 5/1977 | Clark |
| 4,034,013 A | 7/1977 | Lane |
| 4,045,514 A | 8/1977 | Iwahashi et al. |
| 4,139,600 A | 2/1979 | Rollmann et al. |
| 4,180,494 A | 12/1979 | Fromuth et al. |
| 4,287,315 A | 9/1981 | Meyer et al. |
| 4,303,772 A | 12/1981 | Novicky |
| 4,393,153 A | 7/1983 | Hepp |
| 4,400,333 A | 8/1983 | Neefe |
| 4,694,031 A | 9/1987 | Morita et al. |
| 4,745,029 A | 5/1988 | Kambour |
| 4,788,251 A | 11/1988 | Brown et al. |
| 4,803,235 A | 2/1989 | Okada |
| 4,906,202 A | 3/1990 | Germ |
| 4,906,696 A | 3/1990 | Fischer et al. |
| 5,025,066 A | 6/1991 | DeRudder et al. |
| 5,061,558 A | 10/1991 | Fischer et al. |
| 5,068,285 A | 11/1991 | Laughner |
| 5,124,402 A | 6/1992 | Laughner et al. |
| 5,189,091 A | 2/1993 | Laughner |
| 5,200,492 A | 4/1993 | Ohnaga et al. |
| 5,219,915 A | 6/1993 | McKee et al. |
| 5,280,070 A | 1/1994 | Drzewinski et al. |
| 5,284,916 A | 2/1994 | Drzewinski |
| 5,292,809 A | 3/1994 | Drzewinski et al. |
| 5,308,894 A | 5/1994 | Laughner |
| 5,369,154 A | 11/1994 | Laughner |
| 5,441,997 A | 8/1995 | Walsh et al. |
| 5,449,557 A | 9/1995 | Liebler et al. |
| 5,470,658 A | 11/1995 | Gasca et al. |
| 6,060,538 A | 5/2000 | Gallucci |
| 6,252,002 B1 | 6/2001 | Yamada et al. |
| 6,486,251 B1 | 11/2002 | Patel |
| 6,545,089 B1 | 4/2003 | DeRudder et al. |
| 6,646,068 B2 | 11/2003 | Chisholm et al. |
| 6,653,391 B1 | 11/2003 | Weber et al. |
| 7,294,659 B2 | 11/2007 | Yatake |
| 7,385,013 B2 | 6/2008 | Kobayashi et al. |
| 7,732,515 B2 | 6/2010 | Jang et al. |
| 7,960,464 B2 | 6/2011 | Kobayashi et al. |
| 8,044,143 B2 | 10/2011 | Park et al. |
| 2002/0042483 A1 | 4/2002 | Vanderbilt |
| 2003/0032725 A1 | 2/2003 | Gaggar et al. |
| 2005/0159533 A1 | 7/2005 | Nabeshima et al. |
| 2005/0239949 A1 | 10/2005 | Nakamura et al. |
| 2006/0004154 A1 | 1/2006 | DeRudder et al. |
| 2006/0030647 A1 | 2/2006 | Ebeling et al. |
| 2006/0051587 A1 | 3/2006 | Mori et al. |
| 2006/0100307 A1 | 5/2006 | Uerz et al. |
| 2006/0135690 A1 | 6/2006 | Juikar et al. |
| 2007/0265371 A1 | 11/2007 | Takahashi et al. |
| 2008/0009571 A1 | 1/2008 | Pixton et al. |
| 2008/0153954 A1 | 6/2008 | Arpin |
| 2008/0242789 A1 | 10/2008 | Zhu et al. |
| 2009/0080079 A1 | 3/2009 | Kogure et al. |
| 2009/0118402 A1 | 5/2009 | Jang et al. |
| 2009/0209696 A1 | 8/2009 | Lee et al. |

(Continued)

FOREIGN PATENT DOCUMENTS

| | | |
|---|---|---|
| CN | 1285858 A | 2/2001 |
| DE | 19845317 A1 | 4/2000 |

(Continued)

OTHER PUBLICATIONS

Translation of JP 2005-220173, Aug. 2005.*
Translation of JP 05-125260, May 1993.*
Translation of JP 06-136212, May 1994.*
Translation of JP 06-122771, May 1994.*
International Search Report in counterpart International Application No. PCT/KR2007/004743, dated Jan. 4, 2008.
International Preliminary Report on Patentability in counterpart International Application No. PCT/KR2007/004743, dated Mar. 31, 2009.
European Search Report in counterpart European Application No. 07808474 dated Sep. 28, 2011, pp. 1-4.
Taiwanese Office Action in counterpart Taiwanese Application No. 96136059 issued on May 5, 2011, pp. 1-9.

(Continued)

*Primary Examiner* — Hui Chin
(74) *Attorney, Agent, or Firm* — Additon, Higgins, Pendleton & Ashe, P.A.

(57) ABSTRACT

Disclosed herein are a thermoplastic resin composition and a plastic article produced from the resin composition. The thermoplastic resin composition comprises a thermoplastic resin, glass fibers having a cross-sectional aspect ratio greater than or equal to about 1.5, and a branched graft copolymer comprising a polyolefin as a main chain.

18 Claims, 1 Drawing Sheet

(56) References Cited

U.S. PATENT DOCUMENTS

| | | | |
|---|---|---|---|
| 2010/0029855 | A1 | 2/2010 | Matsuoka et al. |
| 2010/0113648 | A1 | 5/2010 | Niessner et al. |
| 2010/0152357 | A1 | 6/2010 | Kwon et al. |
| 2010/0160529 | A1 | 6/2010 | Lee et al. |
| 2010/0160532 | A1 | 6/2010 | Park et al. |
| 2010/0168272 | A1 | 7/2010 | Park et al. |
| 2010/0197827 | A1 | 8/2010 | Kim et al. |
| 2010/0240831 | A1 | 9/2010 | Kim et al. |
| 2010/0256288 | A1 | 10/2010 | Kim et al. |
| 2011/0009524 | A1 | 1/2011 | Kwon et al. |
| 2011/0021677 | A1 | 1/2011 | Kwon et al. |
| 2011/0040019 | A1 | 2/2011 | Kwon et al. |
| 2011/0160380 | A1 | 6/2011 | Kwon et al. |
| 2012/0065318 | A1 | 3/2012 | Park et al. |
| 2012/0129989 | A1 | 5/2012 | Kim et al. |

FOREIGN PATENT DOCUMENTS

| | | | | |
|---|---|---|---|---|
| DE | 69829099 | T2 | | 12/2005 |
| EP | 0033393 | A2 | | 8/1981 |
| EP | 0114288 | A2 | | 8/1984 |
| EP | 0180417 | A2 | | 5/1986 |
| EP | 0246620 | A2 | | 5/1987 |
| EP | 0376616 | A2 | | 7/1990 |
| EP | 0528462 | A1 | | 2/1993 |
| EP | 0787769 | A2 | | 8/1997 |
| EP | 1010725 | A2 | | 6/2000 |
| EP | 2204412 | A1 | | 7/2010 |
| JP | 53-134799 | A | | 11/1978 |
| JP | 57-125241 | A | | 8/1982 |
| JP | 58-196250 | A | | 11/1983 |
| JP | 62-268612 | A | | 11/1987 |
| JP | 10-219026 | | | 8/1988 |
| JP | 04-023856 | A | | 1/1992 |
| JP | 04-359953 | A | | 12/1992 |
| JP | 04-359954 | A | | 12/1992 |
| JP | 05-098136 | A | | 4/1993 |
| JP | 05125260 | A | * | 5/1993 ............. C08L 67/00 |
| JP | 05-194829 | | | 8/1993 |
| JP | 06-122771 | A | | 5/1994 |
| JP | 06122771 | A | * | 5/1994 ................ C08J 5/08 |
| JP | 06136212 | A | * | 5/1994 ............. C08L 25/12 |
| JP | 06-313089 | A | | 11/1994 |
| JP | 07-018186 | | | 1/1995 |
| JP | 07-026101 | | | 1/1995 |
| JP | 10-060241 | A | | 3/1998 |
| JP | 10-060242 | A | | 3/1998 |
| JP | 10-072546 | | | 3/1998 |
| JP | 11-129246 | A | | 5/1999 |
| JP | 11-181168 | A | | 7/1999 |
| JP | 11-279385 | | | 10/1999 |
| JP | 2000-265001 | A | | 9/2000 |
| JP | 2000-265046 | | | 9/2000 |
| JP | 2000265046 | A | * | 9/2000 ............. C08L 67/02 |
| JP | 2000-327992 | | | 11/2000 |
| JP | 2001-049072 | A | | 2/2001 |
| JP | 2002-080676 | A | | 3/2002 |
| JP | 2003-525335 | | | 8/2003 |
| JP | 2003-313392 | | | 11/2003 |
| JP | 2004-091692 | | | 3/2004 |
| JP | 2004-155928 | | | 6/2004 |
| JP | 2005-161693 | | | 6/2005 |
| JP | 2005-220173 | A | | 8/2005 |
| JP | 2005220173 | A | * | 8/2005 ............. C08L 23/00 |
| JP | 2005-307180 | | | 11/2005 |
| JP | 2006-249292 | A | | 9/2006 |
| JP | 2006-257284 | A | | 9/2006 |
| JP | 2006-342246 | A | | 12/2006 |
| JP | 2007-077222 | | | 3/2007 |
| JP | 2008-013702 | A | | 1/2008 |
| KR | 10-1988-0004915 | | | 6/1988 |
| KR | 1996-0007611 | B1 | | 6/1996 |
| KR | 1998-055579 | | | 9/1998 |
| KR | 10-1999-0018287 | B1 | | 3/1999 |
| KR | 10-1999-0029495 | A | | 4/1999 |
| KR | 10-1999-0054644 | | | 7/1999 |
| KR | 10-2000-0038719 | A | | 7/2000 |
| KR | 10-2000-0048033 | A | | 7/2000 |
| KR | 10-2001-0032100 | A | | 4/2001 |
| KR | 10-2001-0070975 | A | | 7/2001 |
| KR | 2004-0079118 | A | | 9/2004 |
| KR | 10-2005-0032100 | A | | 4/2005 |
| KR | 10-0514272 | | | 9/2005 |
| KR | 10-2005-0109049 | A | | 11/2005 |
| KR | 10-0581437 | B | | 5/2006 |
| KR | 10-0709878 | B1 | | 4/2007 |
| KR | 10-2007-0070686 | A | | 7/2007 |
| KR | 10-2007-0072372 | A | | 7/2007 |
| KR | 10-0767428 | A1 | | 10/2007 |
| KR | 10-2008-0062975 | A | | 7/2008 |
| KR | 10-2008-0063054 | A | | 7/2008 |
| KR | 10-0871436 | A | | 11/2008 |
| KR | 10-2009-0030511 | A | | 3/2009 |
| KR | 10-2010-0071715 | A | | 6/2010 |
| WO | 02/088044 | A1 | | 11/2002 |
| WO | 2005/075554 | A1 | | 8/2005 |
| WO | 2007/119920 | A1 | | 10/2007 |
| WO | 2007/140101 | A1 | | 12/2007 |
| WO | 2008/039017 | A1 | | 4/2008 |
| WO | 2008/081791 | A1 | | 7/2008 |
| WO | 2009/078593 | A1 | | 6/2009 |
| WO | 2009/078602 | A1 | | 6/2009 |
| WO | 2009/113762 | A2 | | 9/2009 |
| WO | 2009/116722 | A1 | | 9/2009 |
| WO | 2009/128601 | A1 | | 10/2009 |
| WO | 2011/013882 | A1 | | 2/2011 |

OTHER PUBLICATIONS

English Translation of Taiwanese Office Action in counterpart Taiwanese Application No. 96136059 issued on May 5, 2011, pp. 1-5.
Office Action in commonly owned U.S. Appl. No. 12/640,343 mailed Feb. 22, 2012, pp. 1-13.
Final Office Action in commonly owned U.S. Appl. No. 12/640,343 mailed Jun. 5, 2012, pp. 1-12.
Office Action in commonly owned U.S. Appl. No. 12/641,752 mailed Jan. 10, 2011, pp. 1-10.
Notice of Allowance in commonly owned U.S. Appl. No. 12/641,752 mailed Jul. 20, 2011, pp. 1-9.
International Search Report in commonly owned International Application No. PCT/KR2009/007944 dated Aug. 13, 2010, pp. 1-6.
Office Action in commonly owned U.S. Appl. No. 13/300,746 mailed Apr. 9, 2012, pp. 1-19.
International Search Report in commonly owned International Application No. PCT/KR2009/007917 dated Aug. 24, 2010, pp. 1-9.
English-translation of Abstract for Korean Publication No. 1998-055579, published Sep. 25, 1998, pp. 1.
IGRANOX 1076, SpecialChem, Ciba, now part of BASF, 2012 Retrieved online<http://www.specialchem4adhesives.com>, pp. 1.
Office Action in commonly owned U.S. Appl. No. 13/362,068 mailed Apr. 6, 2012, pp. 1-24.
Full English Translation of JP 04-359953.
Full English Translation of JP 04-359954.
French Search Report and Written Opinion in commonly owned French Application No. 0959193 dated May 27, 2010, pp. 1-5.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.

(56) References Cited

OTHER PUBLICATIONS

European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
European Search Report in commonly owned European Application No. 08873425.6 dated May 29, 2012, pp. 1-5.
International Search Report in commonly owned International Application No. PCT/KR2008/007157, dated May 28, 2009, pp. 1-2.
Office Action in commonly owned U.S. Appl. No. 12/792,176 mailed Nov. 16, 2011, pp. 1-12.
International Search Report in commonly owned International Application No. PCT/KR2008/007825, dated Aug. 28, 2009, pp. 1-2.
Office Action in commonly owned U.S. Appl. No. 12/880,209 mailed Feb. 16, 2011, pp. 1-10.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.
International Search Report in commonly owned International Application No. PCT/KR2008/007820 dated Jul. 28, 2009, pp. 1-2.
Final Office Action in commonly owned U.S. Appl. No. 12/792,176 mailed Apr. 19, 2012, pp. 1-10.
Chinese Search Report in commonly owned Chinese Application No. 200980159831.0 dated Dec. 17, 2012, pp. 1-2.
Final Office Action in commonly owned U.S. Appl. No. 13/300,746 mailed Jan. 3, 2013, pp. 1-14.
Office Action in commonly owned U.S. Appl. No. 13/300,746 mailed Sep. 11, 2012, pp. 1-20.
Final Office Action in commonly owned U.S. Appl. No. 13/362,068 mailed Jan. 31, 2012, pp. 1-9.
Final Office Action in commonly owned U.S. Appl. No. 12/488,855 mailed Apr. 6, 2012, pp. 1-20.
Office Action in commonly owned U.S. Appl. No. 12/488,855 mailed Oct. 26, 2011, pp. 1-19.

\* cited by examiner

THERMOPLASTIC RESIN COMPOSITION AND PLASTIC ARTICLE

CROSS-REFERENCE TO RELATED APPLICATIONS

This non-provisional application is a continuation-in-part application of PCT Application No. PCT/KR2007/004743, filed Sep. 28, 2007, pending, which designates the U.S. and which is hereby incorporated by reference in its entirety, and claims priority therefrom under 35 USC Section 120. This application also claims priority under 35 USC Section 119 from Korean Patent Application No. 10-2006-0095291, filed Sep. 29, 2006, the entire disclosure of which is also hereby incorporated by reference.

FIELD OF THE INVENTION

The present invention relates to a thermoplastic resin composition and a plastic article.

BACKGROUND OF THE INVENTION

Thermoplastic resins reinforced with glass fibers can exhibit improved tensile strength and excellent flexural strength, while maintaining the inherently superior moldability of the thermoplastic resins. In particular, glass fiber-reinforced thermoplastic resins can have superior flexural modulus and good heat resistance, and thus can be suitable for use in components that may be exposed to a continuous load and/or be required to withstand continuous heat. Based on these properties, glass fiber-reinforced thermoplastic resins are widely utilized in applications such as components for automobiles, electronic products, and the like.

However, glass fiber-reinforced thermoplastic resins may have drawbacks, e.g., it may be necessary to carry out injection molding at relatively higher temperatures due to significant decreases in flowability resulting from the glass fibers. Furthermore, when glass fiber-reinforced thermoplastic resins are subjected to injection molding, a difference in shrinkage ratio, e.g., between an injection direction and a vertical direction, may occur due to different orientations of the glass fibers resulting from resin flow during injection. As a result, plastic articles produced from the thermoplastic resin composition may be unintentionally bent or warped, which may deteriorate the quality of downstream products including the plastic article. In addition, glass fiber-reinforced thermoplastic resins may exhibit lower impact resistance, as compared to thermoplastic resins to which no glass fiber is added. Accordingly, they may be unsuitable for producing components that are likely to be exposed to external impacts.

In an attempt to solve problems such as reduction in impact resistance resulting from the use of glass fibers, an impact modifier, e.g., a core-shell graft copolymer, may be added to a polycarbonate resin. However, the addition of the core-shell graft copolymer may decrease flowability of the polycarbonate resin and, as a result, the glass fibers may be broken during an extrusion processes. Accordingly, there may not be enough improvement in impact resistance to achieve a desired level of impact resistance.

SUMMARY OF THE INVENTION

One aspect of the present invention provides a thermoplastic resin composition exhibiting improved flowability, good impact resistance, and excellent bending properties. The thermoplastic resin composition of the invention comprises: (A) a thermoplastic resin; (B) glass fibers having a cross-sectional aspect ratio greater than or equal to about 1.5; and (C) a branched graft copolymer comprising polyolefin as a main chain.

In accordance with another aspect of the present invention, there is provided a plastic article produced from the thermoplastic resin composition. The plastic article of the invention can include: a thermoplastic resin matrix; glass fibers dispersed in the thermoplastic resin matrix, the glass fibers having a cross-sectional aspect ratio greater than or equal to about 1.5; and a branched graft copolymer comprising polyolefin as a main chain.

BRIEF DESCRIPTION OF THE DRAWINGS

The above and other aspects, features and advantages of the present invention will be more clearly understood from the following detailed description, taken in conjunction with the accompanying drawings wherein.

DETAILED DESCRIPTION OF THE INVENTION

Figure 1:
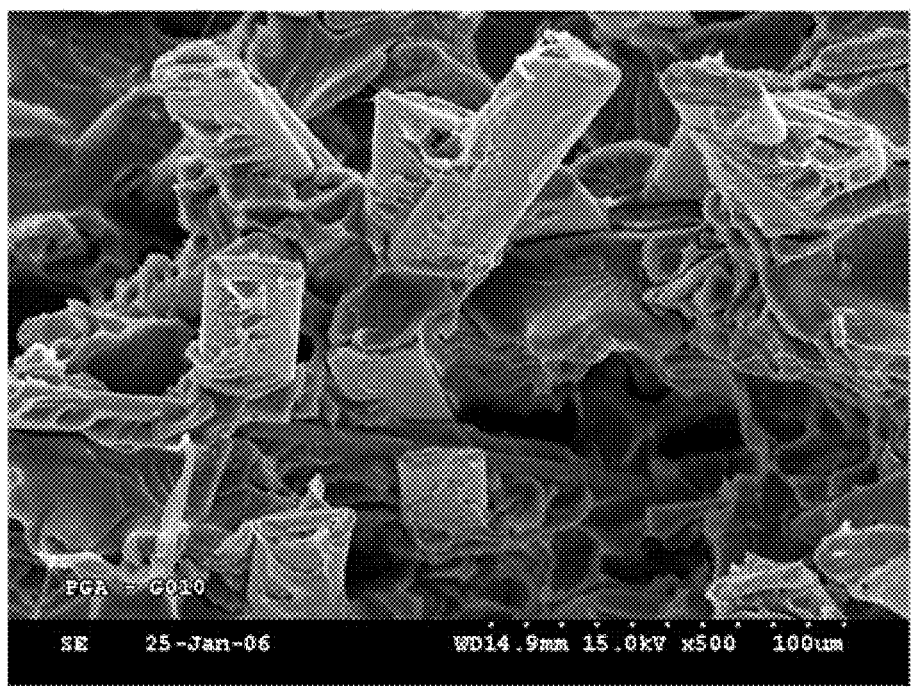
FIG. 1 is a SEM image of a thermoplastic resin composition prepared in Example 2, as set forth in Table 1.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

One aspect of the present invention is directed to a thermoplastic resin composition comprising: (A) a thermoplastic resin; (B) glass fibers having a cross-sectional aspect ratio greater than or equal to about 1.5; and (C) a branched graft copolymer comprising polyolefin as a main chain.

The thermoplastic resin composition comprises glass fibers that may have a cross-sectional aspect ratio greater than or equal to about 1.5, instead of conventional glass fibers that typically may have a cross-sectional aspect ratio of 0.9 to 1.1. Thus, a reduction in the degree in flowability that might otherwise result from the addition of the glass fibers may be significantly reduced, and orientation effects, i.e., due to the orientation of glass fibers according to resin flow, may also be reduced. As a result, problems such as bending or warpage in plastic articles produced from the thermoplastic resin composition may also be reduced.

In addition, the thermoplastic resin composition comprises a branched graft copolymer. Accordingly, the thermoplastic resin composition may provide impact resistance that is not significantly reduced by the addition of the glass fibers.

A more detailed explanation of respective constituent components of the thermoplastic resin composition is provided below.

(A) Thermoplastic Resin

The thermoplastic resin used in the thermoplastic resin composition may be any type that is suitable for extrusion or injection molding. Examples of suitable thermoplastic resins include without limitation polycarbonate-based resins, polyester-based resins, polyamide-based resins, polystyrene-based resins, polyolefin-based resins, polyacetal-based resins, polyphenylsulfide-based resins, styrene-containing graft copolymer resins, maleimide-based copolymer resins, and the like.

The thermoplastic resin used may also be a copolymer, or mixture of two or more kinds of thermoplastic resins. Examples of the copolymer or mixture include without limitation acrylonitrile-butadiene-styrene (ABS), polycarbonate/polyester, polycarbonate/ABS and ABS/polyamide resins.

The particular resin used can be selected based on the desired physical properties of the glass fiber-reinforced thermoplastic resin composition, as will be appreciated by the skilled artisan. Polycarbonate-based resins, polyester-based resins, styrene-containing graft copolymer resins and maleimide-based copolymer resins can, for example, be advantageous for various applications. However, any thermoplastic resin that can be extruded or injection molded may be used, without limitation to the afore-mentioned examples.

Hereinafter, exemplary embodiments of polycarbonate-based resins, polyester-based resins, styrene-containing graft copolymer resins and maleimide-based copolymer resins suitable for use as the thermoplastic resin will be provided.

The polycarbonate-based resin used as the thermoplastic resin may be prepared by a reaction of dihydric phenol with phosgene in the presence of a chain transfer agent and a catalyst, or by an ester-interchange reaction of dihydric phenol with a carbonate precursor such as diphenol carbonate.

The dihydric phenol can be bisphenol, for example, 2,2-bis(4-hydroxyphenyl)propane (bisphenol A). Bisphenol A may be partially or wholly replaced by another dihydric phenol. Examples of other suitable dihydric phenols, in addition to bisphenol A include without limitation hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, halogenated bisphenols such as 2,2-bis(3,5-dibromo-4-hydroxyphenyl)propane, and the like, and combinations thereof.

Methods for preparing polycarbonate-based resins and the use of the polycarbonate-based resins in glass fiber-reinforced thermoplastic resins are well-known to those skilled in the art, and thus detailed explanations thereof are not repeated here.

Exemplary polycarbonate-based resins may include linear polycarbonate resins, branched polycarbonate resins, polyester/carbonate copolymer resins or silicon copolymer polycarbonate resins.

The linear polycarbonate resin may be a bisphenol A-based polycarbonate resin.

The branched polycarbonate resin may be prepared by reacting a multifunctional aromatic compound, such as trimellitic anhydride or trimellitic acid, with dihydroxyphenol in the presence of a carbonate precursor.

The polyester/carbonate copolymer resin may be prepared by reacting carboxylic acid with a dihydric phenol and a carbonate precursor.

The polycarbonate-based resin can have a weight average molecular weight of about 10,000 to about 200,000, for example about 15,000 to about 80,000.

The present invention is not limited to the polycarbonate-based resins disclosed above, and any polycarbonate resin that is suitable for use as a glass fiber-reinforced thermoplastic resin may be used in the present invention, without particular limitation. The polycarbonate resin may be used singly or as a mixture thereof, or may be a copolymer prepared with two or more kinds of dihydric phenols.

The polyester-based resin used as the thermoplastic resin can include a resin represented by Formula I below:

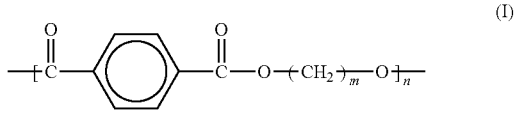

In Formula I, m is an integer of 2 to 4, and n is an integer of 50 to 300.

Methods for preparing the polyester-based resin and the use of the polyester-based resin in glass fiber-reinforced thermoplastic resins are well-known to those skilled in the art.

An exemplary method for preparing a polyester-based resin is given below.

Esterification may be carried out at a temperature of about 200° C. to about 230° C. by reacting an acidic ingredient with a glycol ingredient in the presence of a catalyst and other additives including stabilizers, while low-molecular-weight ester condensed by-products thus formed are removed from the system. Generally, the esterification proceeds until the amount of the ester condensed by-products removed is at least about 95% of the theoretical amount.

After the completion of the esterification, polycondensation of polyester may be induced by elevating the column temperature up to about 250° C. to about 0.280° C. and, at the same time, decreasing the column pressure to about 1 mmHg or below. The polycondensation reaction may be finished while stirring, and the vacuum may then be replaced with nitrogen to allow the reactants to be removed, thus providing a polyester resin.

In the preparation of the polyester resins, the acidic ingredient may be generally a terephthalic acid or a lower alkyl ester, or mixtures thereof with a minor amount of isophthalic acid, orthophthalic acid, aliphatic dicarbonic acid or lower alkyl ester thereof.

The glycol ingredient may be ethylene glycol, propylene glycol or butylene glycol alone, combinations thereof, or mixtures thereof with 1,6-hexanediol, 1,4-cyclohexane dimethanol or the like.

The catalyst may be antimony oxide, or an organotitanium compound such as tetrabutyl titanate or tetraisopropyl titanate. The catalyst may also be an organotin compound alone, or mixtures thereof with an organotitanium compound, and, furthermore, an alkaline metal or acetate. When an organotitanium compound is used, magnesium acetate or lithium acetate may be used as a co-catalyst. In addition to reactants and catalysts, minor ingredients such as antioxidants, antistatic agents and other additives may be used in the present invention.

The present invention is not limited to the polyester-based resin disclosed herein, and any polyester resin, and preparation thereof, that is suitable for use in a glass fiber-reinforced thermoplastic resin may be used in the present invention without particular limitation.

The styrene-containing graft copolymer resin may be used as the thermoplastic resin.

The styrene-containing graft copolymer resin may be prepared by graft-polymerizing rubber polymers, aromatic vinyl monomers and vinyl cyanide monomers. More specifically, the styrene-containing graft copolymer resin may be prepared by adding about 40 to about 90 parts by weight of a monomer mixture of aromatic vinyl monomers and vinyl cyanide monomers to about 10 to about 60 parts by weight of rubber polymers, followed by graft-polymerization. The monomer mixture may comprise about 40 to about 90% by weight of aromatic vinyl monomers and about 10 to about 60% by weight of vinyl cyanide monomers.

Examples of suitable rubber polymers that may be used in the present invention may include without limitation diene-based rubbers, e.g., polybutadiene, poly(styrene-butadiene) and poly(acrylonitrile-butadiene); saturated rubbers in which hydrogen is added to the diene-based rubbers; isoprene rubbers; chloroprene rubbers; acrylic rubbers, e.g., polybutyl acrylic acid; terpolymers of ethylene/propylene/diene (EPDM), and the like, and combinations thereof.

Examples of suitable aromatic vinyl monomers that may be used in the present invention include without limitation styrene, α-methyl styrene, p-methyl styrene, and the like, and combinations thereof.

Examples of suitable vinyl cyanide monomers that may be used in the present invention include without limitation acrylonitrile, methacrylonitrile, and the like, and combinations thereof.

Methods for preparing styrene-containing graft copolymer resins from rubber polymers, aromatic vinyl monomers and vinyl cyanide monomers are well-known to those skilled in the art. For example, emulsion polymerization, suspension polymerization, solution polymerization or bulk polymerization may be used to prepare the styrene-containing graft copolymer resins. For example, the styrene-containing graft copolymer resin may be prepared by adding aromatic vinyl monomers and vinyl cyanide monomers to rubber polymers in the presence of a polymerization initiator, followed by emulsion polymerization or bulk polymerization.

The styrene-containing graft copolymer resin can include rubber particles having an average diameter of about 0.1 to about 0.5 μm.

The present invention is not limited to the styrene-containing graft copolymer resin disclosed above, and any styrene-containing graft copolymer resin, and preparation thereof, that is suitable for use in glass fiber-reinforced thermoplastic resins may be used without particular limitation.

In addition to the afore-mentioned resins, a maleimide-based copolymer resin may also be used as the thermoplastic resin.

The maleimide-based copolymer resin may comprise about 30 to about 70 parts by weight of an aromatic vinyl monomer, about 30 to about 50 parts by weight of a maleimide monomer and about 1 to about 20 parts by weight of an unsaturated carboxylic acid anhydride monomer. The maleimide-based copolymer resin may also optionally comprise about 50 parts or less by weight of a copolymerizable monomer, i.e., 0 to about 50 parts by weight copolymerizable monomer.

Examples of suitable aromatic vinyl monomers that may be used in the present invention include without limitation styrene, α-methyl styrene, vinyl toluene, t-butyl styrene, and the like, and combinations thereof.

Examples of suitable maleimide monomers that may be used in the present invention include without limitation maleimide, N-methyl maleimide, N-butyl maleimide, N-hexyl maleimide, N-dichlorohexyl maleimide, N-phenyl maleimide, N-trimaleimide, and the like, and combinations thereof.

Examples of suitable unsaturated carboxylic acid anhydride monomers that may be used in the present invention include without limitation maleic anhydride, methyl maleic anhydride, 1,2-dimethyl maleic anhydride, ethyl maleic anhydride, phenyl maleic anhydride, and the like, and combinations thereof.

Examples of suitable copolymerizable monomers that may be used in the maleimide resin include without limitation acrylonitrile, methyl methacrylate, ethyl acrylate, ethyl methacrylate, butyl methacrylate, hexyl methacrylate, dicyclohexyl methacrylate, decyl acrylate, decyl methacrylate, octadecyl methacrylate, hydroxyethyl acrylate, hydroxyethyl methacrylate, glycidyl methacrylate, and the like, and combinations thereof.

The maleimide-based copolymer resin may be prepared by copolymerizing the aromatic vinyl monomer, the unsaturated carboxylic acid anhydride monomer and the copolymerizable monomer, and partially imidizing the acid anhydride group of the unsaturated carboxylic acid anhydride monomer by reaction with ammonia or a primary amine. Imidization between a polymeric material containing acid anhydride groups of the polymer chain and an amine compound is well-known to those skilled in the art. For example, the maleimide-based copolymer resin may be prepared by reacting a polymeric material with an amide compound in accordance with imidization methods disclosed in Japanese Patent Publication Nos. 61-26936 and 62-845, the disclosure of each of which is hereby incorporated by reference in their entirety.

The present invention is not limited to the maleimide-based copolymer resin and preparation thereof given as one example herein, and any maleimide-based resin, and preparation thereof, that is suitable for use in glass fiber-reinforced thermoplastic resins may be used without particular limitation.

As mentioned above, in addition to polycarbonate-based, polyester-based, styrene-containing graft copolymer and maleimide-based copolymer resins, any thermoplastic resin that is generally applicable to glass fiber-reinforced thermoplastic resin may be used without limitation. The specific kind and preparation thereof will be apparent to those skilled in the art.

The resin composition may include the thermoplastic resin in an amount of about 40 to about 90% by weight, based on the total weight of a base resin comprising the thermoplastic resin and the glass fibers. When the thermoplastic resin is used in an amount lower than about 40% by weight, reductions in mechanical properties of the thermoplastic resin composition may result from insufficient dispersion of the glass fibers. On the other hand, when the thermoplastic resin is used in an amount exceeding about 90% by weight, the glass fibers may not be sufficient to reinforce flexural strength and provide heat resistance.

(B) Glass Fibers

The thermoplastic resin composition comprises glass fibers having a cross-sectional aspect ratio of about 1.5 or greater.

The term "cross-sectional aspect ratio" used herein is defined as a ratio between the long diameter (a) and the short diameter (b) in one cross-section of glass fibers, as depicted below:

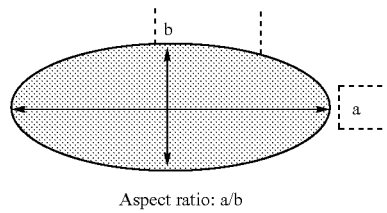

Aspect ratio: a/b

Conventional glass fibers used as thermoplastic resin reinforcements have a predetermined length of, e.g., 3 to 6 mm, a circular cross-sectional aspect ratio of 0.9 to 1.1, and a cross-sectional diameter of, e.g., 10 to 20 µm.

On the other hand, the glass fibers used as a thermoplastic resin reinforcement in the present invention have a cross-sectional aspect ratio greater than or equal to about 1.5, for example a cross-sectional aspect ratio of about 2 to about 8, which includes, for example, 1.5, 2, 2.5, 3, 3.5, 4, 4.5, 5, 5.5, 6, 6.5, 7, 7.5, and 8, and values therebetween. These glass fibers may have a length equal to the conventional glass fibers, i.e., about 3 to about 6 mm, while having an aspect ratio of about 1.5 or greater.

The use of glass fibers with an aspect ratio of about 1.5 or greater may reduce the impact on flowability caused by addition of the glass fibers, and may reduce orientation effects wherein the glass fibers are oriented according to resin flow. As a result, it may be possible to considerably reduce problems such as bending or warpage in plastic articles produced from the thermoplastic resin composition. Accordingly, the glass fiber-reinforced thermoplastic resin composition may exhibit, improved flowability and bending properties.

In order to prevent reactions between the glass fibers and the thermoplastic resin contained in the resin composition, and to improve the extent of impregnation, a suitable material may be coated on the surface of the glass fiber. Based on the type of coating material used, overall flowability and impact strength of the thermoplastic resin composition may be varied. The type of materials that can be coated on the surface of glass fibers and modifications of the flowability and impact strength depending upon the type are well-known to those skilled in the art.

The glass fibers may be used in an amount of about 10 to about 60% by weight, based on the total weight of the base resin comprising the thermoplastic resin and the glass fibers. When the glass fibers are used in an amount less than about 10% by weight, the flexural strength and heat resistance provided by the thermoplastic resin composition may be reduced. On the other hand, when the glass fibers are used in an amount greater than about 60% by weight, the glass fibers may be poorly dispersed, which may reduce the mechanical properties provided by the thermoplastic resin composition.

(C) Branched Graft Copolymer Comprising Polyolefin as Main Chain.

The thermoplastic resin composition comprises a branched graft copolymer comprising polyolefin as a main chain, in addition to the thermoplastic resin and the glass fibers. Branched graft copolymers and methods of making the same are known in the art and are readily understood by those skilled in the art.

The main chain moiety may be polyolefin. Examples of suitable materials comprising the main chain moiety in the branched graft copolymer include without limitation polyethylene, polypropylene, ethylene-propylene copolymer, and the like, and combinations thereof. The main chain may include about 70 to about 100% by weight of at least one polyolefin selected from polyethylene, polypropylene, and ethylene-propylene copolymers to provide good reinforcement of impact resistance.

Suitable functional groups comprising the branch-moiety include those that have partial compatibility with the thermoplastic resin of the thermoplastic resin composition of the invention, such as polycarbonate resins. Specific examples thereof include without limitation acrylates such as methyl acrylate, ethyl acrylate and butyl acrylate, modified esters such as ethylene glycol, arylates, acrylonitrile, and the like, and combinations thereof.

The amount of the branch moiety can range from about 5 to about 50% by weight, for example about 5 to about 40% by weight, based on the total weight of the branched graft copolymer. When the branch moiety is less than about 5% by weight, the branched graft copolymer may have poor compatibility with the thermoplastic resin, such as polycarbonate, and separation may thus occur. On the other hand, when the branch moiety exceeds about 50% by weight, it may afford only a limited impact resistance-reinforcing function, which may reduce impact resistance.

The branched graft copolymer comprising polyolefin as a main chain can be used in the present invention in an amount of about 0.1 to about 10 parts by weight, for example about 1 to about 7 parts by weight, based on 100 parts by weight of the base resin comprising the thermoplastic resin and glass fibers. When the branched graft copolymer is used in an amount less than about 0.1 parts by weight, impact resistance may not be improved to a desired level. On the other hand, when the branched graft copolymer is used in an amount exceeding about 10 parts by weight, mechanical properties, e.g., flexural strength, may be reduced.

The thermoplastic resin composition of the present invention may comprise other additives, in addition to the three major ingredients described herein, depending on the purpose and the desired effects. To improve mechanical properties and physical properties, e.g., heat deflection temperature, the resin composition may further comprise an inorganic additive such as another type of glass fiber, carbon fibers, talc, silica, mica, alumina, and the like, and combinations thereof. The resin composition may further comprise one or more additives selected from UV absorbers, heat stabilizers, antioxidants, flame retardants, light stabilizers, lubricants, pigments, dyes, and the like, and combinations thereof. The types of suitable additives are apparent to those skilled in the art and the content thereof may be about 50 parts by weight or less, i.e., 0 to about 50 parts by weight, based on 100 parts by weight of the resin composition.

The thermoplastic resin composition may be prepared by any method well-known in the art. For example, the resin composition may be prepared in pellet form by mixing the constituent components, optionally with other additives, followed by extruding the mixed components through an extruder.

The present invention also provides a plastic article prepared from the thermoplastic resin composition. As discussed above, the plastic article comprises a thermoplastic resin, glass fibers having a cross-sectional aspect ratio greater than or equal to about 1.5, and a branched graft copolymer comprising polyolefin as a main chain.

The plastic article may maintain several advantages derived from the addition of glass fibers, e.g., improvement in tensile and flexural strength, superior flexural modulus and good heat resistance, and thus may be suitable for use in components that are exposed to a continuous load or are required to withstand continuous heat.

By addition of glass fibers having a cross-sectional aspect ratio of about 1.5, reductions in the degree of flowability of the glass fiber-reinforced thermoplastic resin composition used to produce plastic articles may be significantly lessened, as compared to conventional glass fiber-reinforced thermoplastic resin compositions. As a result, problems such as bending and warpage in plastic articles produced from the thermoplastic resin composition may be significantly reduced.

The thermoplastic resin composition comprises the branched graft copolymer comprising polyolefin as a main chain, and thus may be capable of avoiding reduction in impact resistance which might otherwise be caused by the addition of the glass fibers. Based on these properties, the plastic articles may be widely utilized in applications including precision electric and electronic components, precision automobile components, and the like, which require precise dimensional stability and good impact resistance.

According to the present invention, a thermoplastic resin composition is provided that exhibits only slight reductions in flowability and exhibits good bending properties as well as improved impact resistance. A plastic article can be produced from the thermoplastic resin composition. Furthermore, the thermoplastic resin composition may be utilized to produce various articles such as precision electric and electronic components, precision automobile components, and the like, which require precise dimensional stability and good impact strength.

The present invention will be better understood from the following examples. However, these examples are given for illustrative purposes and are not to be construed as limiting the scope of the invention.

The following is a detailed description of ingredients used in the following Examples and Comparative Examples: (A) thermoplastic resin ((A1) polycarbonate-based resin), (A2) polyester-based resin and (A3) ABS resin comprising styrene-containing graft copolymer resin); (B) glass fibers; and (C) impact modifier ((C1) core-shell graft copolymer and (C2) branched graft copolymer).

(A1) Polycarbonate Resin

PANLITE L-1225 WX (available from TEIJIN Limited, Japan) is used as a linear bisphenol-A polycarbonate resin having a weight average molecular weight of 22,000 g/mol.

(A2) Polyester Resin

TRIBIT 1700 polybutylene terephthalate (available from Samyang Co., Ltd.) is used, having a specific gravity of 1.31 g/cm$^3$, a melting point of 226° C. and a specific viscosity of 1.10.

(A3) ABS Resin

The ABS resin including a g-ABS resin (styrene-containing graft copolymer resin) and SAN (styrene/acrylonitrile copolymer) is used.

The g-ABS resin is prepared according to the following procedure. A butadiene rubber latex is injected, such that the content of butadiene is 58 parts by weight, with respect to the total weight of monomers; essential additives, i.e., 1.0 part by weight of potassium oleate, 0.4 parts by weight of cumene hydroperoxide, and 0.3 parts by weight of a mercaptan-based chain transfer agent are added to a mixture including 29 parts by weight of styrene, 13 parts by weight of acrylonitrile, and 150 parts by weight of deionized water; and the mixture is allowed to react at 75° C. for 5 hours, to prepare an ABS graft latex. A 1% sulfuric acid solution is added to the ABS graft latex, followed by solidifying and drying. As a result, a graft copolymer resin is obtained as a powder.

A SAN copolymer resin is prepared by adding essential additives, i.e., 0.17 parts by weight of azobisisobutyronitrile, 0.4 parts by weight of t-dodecyl mercaptan (chain transfer) and 0.5 parts by weight of tricalcium phosphate, to a mixture including 71 parts by weight of styrene, 29 parts by weight of acrylonitrile and 120 parts by weight of deionized water, followed by suspension-polymerization at 75° C. for 5 hours. The SAN copolymer resin thus obtained is washed with water, dehydrated and dried to yield a final SAN copolymer resin as a powder.

(B1) Glass Fiber (Aspect Ratio=4.0)

CSG 3PA-820 (available from Nitto Boseki Co., Ltd., length: 3 mm, the long diameter in one cross-section: 28 µm, the short diameter in one cross-section: 7 µm, the cross-sectional aspect ratio: 4.0) is used as glass fibers having a cross-sectional aspect ratio of about 1.5 or greater.

(B2) Glass Fiber (Aspect Ratio=1.0)

P952 (available from Vetrotex Co., Ltd., a cross-sectional aspect ratio: 1.0, length: 3 mm, cross-sectional diameter: 10 µm, shape: circle) is used as an example of a conventional glass fiber having a cross-sectional aspect ratio of 0.9 to 1.1.

(C1) Core-Shell Graft Copolymer

C-223A (available from MRC Corp.) is used, which is a methylmethacrylate-butadiene-styrene copolymer generally utilized as an impact modifier of polycarbonate.

(C2) Branched Graft Copolymer

Elvaloy 1224 AC (available from Dupont Co., Ltd.) is used, which contains a polyethylene copolymer as a main chain and methyl acrylate as a branch moiety, and has a weight ratio of 24.

The composition of constituent components used in the Examples and Comparative Examples is shown in Tables 1 to 4.

These components are mixed in the amount as shown in Tables 1 to 4, and the mixture is extruded in a twin-screw extruder ($\phi$=45 mm) to prepare resin compositions in pellet form. At this time, the thermoplastic resin is fed into a main feeder and the glass fibers are fed into a side feeder. The pellets thus obtained are dried at 110° C. for 3 hours or more and introduced into an injection machine (10 oz.) at a processing temperature of 280 to 320° C. and a molding temperature of 80 to 100° C., to prepare a test sample for measurement of physical properties.

Prior to the preparation of the test sample, melt flow rate (MFR) is measured in accordance with ASTM D1238, which is an American Standard Test Method (ASTM) for measuring flow rate (flowability) of thermoplastic resins. The melt flow rate is determined by measuring the amount of resin that flows out from a test sample using a 10 kg weight for 10 minutes.

To assess flow field length of a resin under actual injection conditions, injection is carried out by applying a 95% force in a 10 oz. injection machine while maintaining a temperature of a sample mold, having a thickness of 1 mm, at 80° C. Then, a length of the sample is measured to obtain a practical flow field length. The practical flow field length is represented by a relative ratio, based on Comparative Example 1, which contains 20% by weight of glass fibers having a cross-section ratio of 1.

Notched IZOD impact resistance (⅛") of each test sample is measured in accordance with ASTM D256, which is an American Standard Test Method (ASTM) for measuring IZOD impact strength of plastics using a pendulum having a constant weight.

Flexural strength of each test sample is measured in accordance with ASTM 790 which is an American Standard Test Method (ASTM) for measuring flexural properties.

The warpage level (bending property) of the sample is evaluated by the following procedure. First, injection is carried out by applying a 95% force in a 10 oz. injection machine while maintaining a temperature of a film gate mold, having a size of 6"×6" and a thickness of ¹⁄₁₆", at 80° C. Then, the mold is allowed to stand in a constant temperature/humidity room at 23° C. for 24 hours without applying any external force. Subsequently, the warpage level (bending property) of the sample is evaluated. The warpage level is assessed by fixing three vertices of the square sample in contact with the bottom and measuring the height of the remaining one vertex, which extends upward due to warpage of the sample. The warpage level is expressed as a mm unit.

Figure 2:
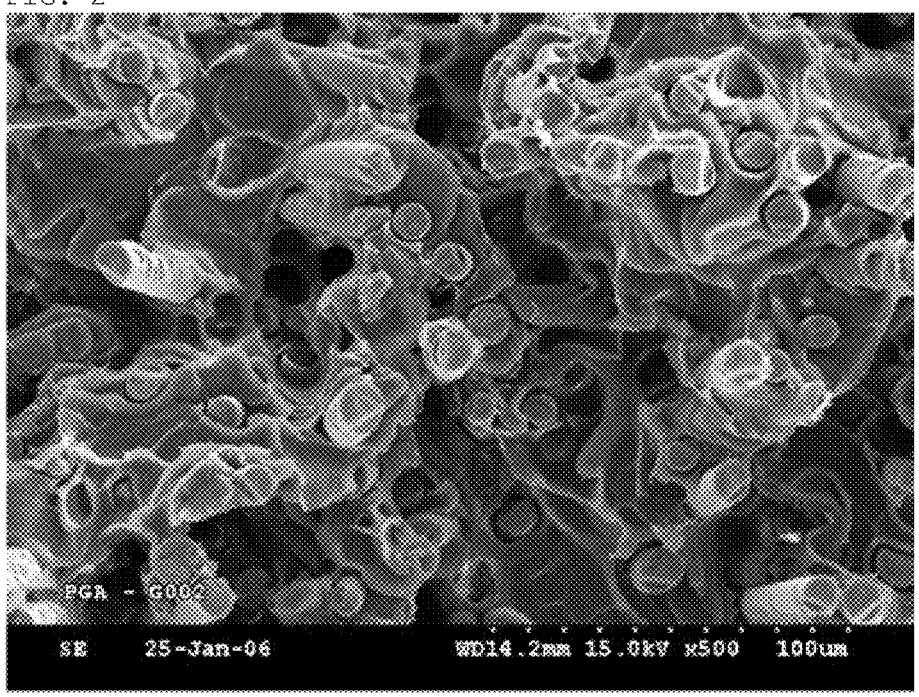
FIG. 2 is a SEM image of a thermoplastic resin composition prepared in Comparative Example 2, as set forth in Table 1.

The flow rate, actual flowability, impact strength, textual strength and bending property thus measured in accordance with the methods described above are shown in Tables 1 to 4. In addition, SEM images of Example 2 and Comparative Example 2 in Table 1 are illustrated in FIGS. 1 and 2, respectively. As shown in FIGS. 1 and 2, Example 2 can secure desirable dispersibility by using glass fibers with an aspect ratio of 4.

TABLE 1

Polycarbonate resin

| | | | Examples | | | | Comparative Examples | | | |
|---|---|---|---|---|---|---|---|---|---|---|
| | | Type | 1 | 2 | 3 | 4 | 1 | 2 | 3 | 4 |
| Composition | (A1) Polycarbonate resin | | 80 | 70 | 60 | 50 | 80 | 70 | 60 | 50 |
| | (B) Glass fiber | (B1) Aspect ratio = 4 | 20 | 30 | 40 | 50 | — | — | — | — |
| | | (B2) Aspect ratio = 1 | — | — | — | — | 20 | 30 | 40 | 50 |
| | (C) Impact modifier | (C1) Core-shell graft copolymer | — | — | — | — | — | — | — | — |
| | | (C2) Branched graft copolymer | 5 | 5 | 5 | 5 | 5 | 5 | 5 | 5 |
| Physical properties | Melt flow rate (MFR) | ASTM D1238 | 26 | 24 | 22 | 20 | 15 | 13 | 12 | 11 |
| | Practical flow field | Inventors' own test | 158% | 150% | 139% | 126% | 100% | 87% | 82% | 78% |
| | Impact strength | ASTM D256 | 20 | 22 | 22 | 21 | 18 | 19 | 18 | 19 |
| | Textual strength | ASTM D790 | 46000 | 68000 | 93000 | 108000 | 45000 | 63000 | 92000 | 100000 |
| | Warpage level (bending property) | Inventors' own test | — | 0.6 | 1.0 | 1.1 | 8.7 | 11.4 | 13.6 | 14.2 |

TABLE 2

Polycarbonate resin

| | | | Comparative Examples | | | | | | | |
|---|---|---|---|---|---|---|---|---|---|---|
| | | Type | 5 | 6 | 7 | 8 | 9 | 10 | 11 | 12 |
| Composition | (A1) Polycarbonate resin | | 80 | 70 | 60 | 50 | 80 | 70 | 60 | 50 |
| | (B) Glass fiber | (B1) Aspect ratio = 4 | 20 | 30 | 40 | 50 | 20 | 30 | 40 | 50 |
| | | (B2) Aspect ratio = 1 | — | — | — | — | — | — | — | — |
| | (C) Impact modifier | (C1) Core-shell graft copolymer | 5 | 5 | 5 | 5 | — | — | — | — |
| | | (C2) Branched graft copolymer | — | — | — | — | — | — | — | — |
| Physical properties | Melt flow rate (MFR) | ASTM D1238 | 20 | 18 | 16 | 14 | 25 | 23 | 21 | 19 |
| | Practical flow field | Inventors' own test | 113% | 108% | 95% | 83% | 156% | 148% | 137% | 125% |
| | Impact strength | ASTM D256 | 12 | 13 | 12 | 13 | 11 | 14 | 14 | 15 |
| | Textual strength | ASTM D790 | 41000 | 62000 | 87000 | 94000 | 47000 | 69000 | 94000 | 109000 |
| | Warpage level (bending property) | Inventors' own test | — | 1.5 | 3.6 | 4.8 | — | 0.7 | 1.1 | 1.2 |

TABLE 3

Polyester resin

|  |  |  | Examples | | | | Comparative Examples | | | |
|---|---|---|---|---|---|---|---|---|---|---|
|  |  | Type | 1 | 2 | 3 | 4 | 1 | 2 | 3 | 4 |
| Composition | (A2) Polyester resin | | 80 | 70 | 60 | 50 | 80 | 70 | 60 | 50 |
| | (B) Glass fiber | (B1) Aspect ratio = 4 | 20 | 30 | 40 | 50 | — | — | — | — |
| | | (B2) Aspect ratio = 1 | — | — | — | — | 20 | 30 | 40 | 50 |
| | (C) Impact modifier: Branched graft copolymer | | 5 | 5 | 5 | 5 | 5 | 5 | 5 | 5 |
| Physical properties | Melt flow rate (MFR) | ASTM D1238 | 40 | 34 | 29 | 23 | 25 | 17 | 13 | 9 |
| | Practical flow field | Inventors' own test | 157% | 132% | 113% | 98% | 100% | 81% | 75% | 69% |
| | Impact strength | ASTM D256 | 12 | 13 | 14 | 14 | 9 | 10 | 12 | 11 |
| | Textual strength | ASTM D790 | 59000 | 81000 | 99000 | 11000 | 61000 | 83000 | 101000 | 112000 |
| | Warpage level (bending property) | Inventors' own test | — | 0.5 | 0.9 | 1.0 | 8.2 | 11.1 | 12.8 | 13.7 |

TABLE 4

ABS resin

|  |  |  | Examples | | | | Comparative Examples | | | |
|---|---|---|---|---|---|---|---|---|---|---|
|  |  | Type | 1 | 2 | 3 | 4 | 1 | 2 | 3 | 4 |
| Composition | (A3) ABS resin | | 80 | 70 | 60 | 50 | 80 | 70 | 60 | 50 |
| | (B) Glass fiber | (B1) Aspect ratio = 4 | 20 | 30 | 40 | 50 | — | — | — | — |
| | | (B2) Aspect ratio = 1 | — | — | — | — | 20 | 30 | 40 | 50 |
| | (C) Impact modifier: Branched graft copolymer | | 5 | 5 | 5 | 5 | 5 | 5 | 5 | 5 |
| Physical properties | Melt flow rate (MFR) | ASTM D1238 | 13 | 11 | 10 | 8 | 6 | 5 | 4 | 3.5 |
| | Practical flow field | Inventors' own test | 163% | 142% | 135% | 121% | 100% | 88% | 75% | 63% |
| | Impact strength | ASTM D256 | 11 | 12 | 12 | 12 | 8 | 9 | 9 | 8 |
| | Textual strength | ASTM D790 | 53000 | 71000 | 88000 | 102000 | 54000 | 70000 | 89000 | 103000 |
| | Warpage level (bending property) | Inventors' own test | — | 0.2 | 0.8 | 0.9 | 7.6 | 10.3 | 11.7 | 12.0 |

It can be seen from Table 1 that Examples 1 to 4, to which glass fibers having a cross-sectional aspect ratio of 4 and a branched graft copolymer are added, exhibit superior flowability, impact resistance and bending property. On the other hand, Comparative Examples 1 to 4, to which glass fibers having a cross-sectional aspect ratio of 1 are added, show reductions in both flowability and bending property.

Further, it can be seen from Table 2 that Comparative Examples 5 to 8, in which a core-shell graft copolymer is used instead of the branched graft copolymer, show reductions in each of flowability, impact resistance and bending property, as well as in flexural strength, and that Comparative Examples 9 to 11, in which no branched graft copolymer is used, show excessive reductions in impact resistance, thus being less suitable than the present invention.

In addition, as is apparent from Tables 3 and 4, the thermoplastic resins of Examples 1 to 4, which are reinforced with glass fibers, having a cross-sectional aspect ratio of 4, show significantly improved flowability and greatly reduced warpage, and thus exhibit considerably improved bending properties. On the other hand, the thermoplastic resins of Comparative Examples 1 to 4, which are reinforced with glass fibers having a cross-sectional aspect ratio of 1, show low flowability and excessive warpage, and thus exhibit reduced bending properties.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A thermoplastic resin composition comprising:
about 100 parts by weight of a base resin comprising about 40 to about 90% by weight of a thermoplastic resin and about 10 to about 60% by weight of glass fibers having a cross-sectional aspect ratio of a long diameter of a cross section of the glass fibers and a short diameter of a cross-section of the glass fibers greater than or equal to about 1.5; and
about 0.1 to about 10 parts by weight of a branched graft copolymer comprising polyolefin as a main chain, wherein the branched graft copolymer comprises a branch moiety in an amount of 15 to about 50% by weight, based on the total weight of the branched graft copolymer,
wherein the branch moiety of the branched graft copolymer comprises acrylate, modified-ester, arylate, acrylonitrile, or a combination thereof, and
wherein the main chain of the branched graft copolymer comprises about 70 to about 100% by weight of polyethylene, polypropylene, or ethylene-propylene copolymer.

2. The thermoplastic resin composition according to claim 1, wherein the thermoplastic resin comprises a polycarbonate-based resin, polyester-based resin, polyamide-based resin, polystyrene-based resin, polyacetal-based resin, polyphenylsulfide-based resin, styrene-containing graft copolymer resin, maleimide-based copolymer resins, or a combination thereof.

3. The thermoplastic resin composition according to claim 2, wherein the thermoplastic resin composition comprises a polycarbonate-based resin, and the polycarbonate-based resin comprises a linear polycarbonate resin, a branched polycarbonate resin, a polyestercarbonate copolymer resin, a silicon copolymer polycarbonate resin, or a combination thereof.

4. The thermoplastic resin composition according to claim 3, wherein the linear polycarbonate resin comprises a bisphenol A-based polycarbonate resin.

5. The thermoplastic resin composition according to claim 2, wherein the thermoplastic resin composition comprises a polyester resin, and the polyester resin comprises a resin represented by Formula I below:

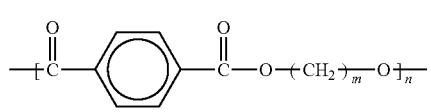
(I)

wherein m is an integer of 2 to 4; and n is an integer of 50 to 300.

6. A thermoplastic resin composition comprising:
about 100 parts by weight of a base resin comprising about 40 to about 90% by weight of a thermoplastic resin composition comprising a styrene-containing graft copolymer resin prepared by graft-polymerizing a rubber polymer, an aromatic vinyl monomer and a vinyl cyanide monomer and about 10 to about 60% by weight of glass fibers having a cross-sectional aspect ratio of a long diameter of a cross section of the glass fibers and a short diameter of a cross-section of the glass fibers greater than or equal to about 1.5; and
about 0.1 to about 10 parts by weight of a branched graft copolymer comprising polyolefin as a main chain.

7. The thermoplastic resin composition according to claim 6, wherein the styrene-containing graft copolymer resin is prepared by graft-polymerizing about 10 to about 60 parts by weight of a rubber polymer, and about 40 to about 90 parts by weight of a monomer mixture comprising about 40 to about 90% by weight of an aromatic vinyl monomer and about 10 to about 60% by weight of a vinyl cyanide monomer.

8. The thermoplastic resin composition according to claim 2, wherein the thermoplastic resin composition comprises a maleimide-based copolymer resin, and the maleimide-based copolymer resin comprises about 30 to about 70 parts by weight of an aromatic vinyl monomer, about 30 to about 50 parts by weight of a maleimide monomer, about 1 to about 20 parts by weight of an unsaturated carboxylic acid anhydride monomer, and about 50 parts or less by weight of a copolymerizable monomer.

9. The thermoplastic resin composition according to claim 1, wherein the glass fibers have a cross-sectional aspect ratio of about 2 to about 8.

10. The thermoplastic resin composition according to claim 1, further comprising a UV absorber, a heat stabilizer, an antioxidant, a flame retardant, a light stabilizer, a lubricant, a pigment, a dye, or a combination thereof.

11. A plastic article produced from the thermoplastic resin composition according to claim 1.

12. A plastic article comprising:
a thermoplastic resin matrix selected from the group consisting of polycarbonate-based resins, polyester-based resins, polyamide-based resins, polystyrene-based resins, polyacetal-based resins, polyphenylsulfide-based resins, styrene-containing graft copolymer resins, maleimide-based copolymer resins, and combination thereof;
glass fibers dispersed in the thermoplastic resin matrix, the glass fibers having a cross-sectional aspect ratio of a long diameter of a cross section of the glass fibers and a short diameter of a cross-section of the glass fibers greater than or equal to about 1.5; and
a branched graft copolymer comprising polyolefin as a main chain.

13. The thermoplastic resin composition according to claim 1, wherein the branched graft copolymer comprises a branch moiety in an amount of 18 to about 50% by weight, based on the total weight of the branched graft copolymer.

14. The thermoplastic resin composition according to claim 13, wherein the branched graft copolymer comprises a branch moiety in an amount of 24 to about 50% by weight, based on the total weight of the branched graft copolymer.

15. The thermoplastic resin composition according to claim 6, wherein the branched graft copolymer comprises a branch moiety in an amount of 15 to about 50% by weight, based on the total weight of the branched graft copolymer.

16. The thermoplastic resin composition according to claim 15, wherein the branched graft copolymer comprises a branch moiety in an amount of 18 to about 50% by weight, based on the total weight of the branched graft copolymer.

17. The thermoplastic resin composition according to claim 16, wherein the branched graft copolymer comprises a branch moiety in an amount of 24 to about 50% by weight, based on the total weight of the branched graft copolymer.

18. The thermoplastic resin composition according to claim 1, wherein the branched graft copolymer consists of said polyolefin as a main chain and said branch moiety.

* * * * *